March 2, 1937. W. WOODWARD 2,072,697
MULTIPLE HEADLIGHT FOR VEHICLES
Filed July 21, 1936
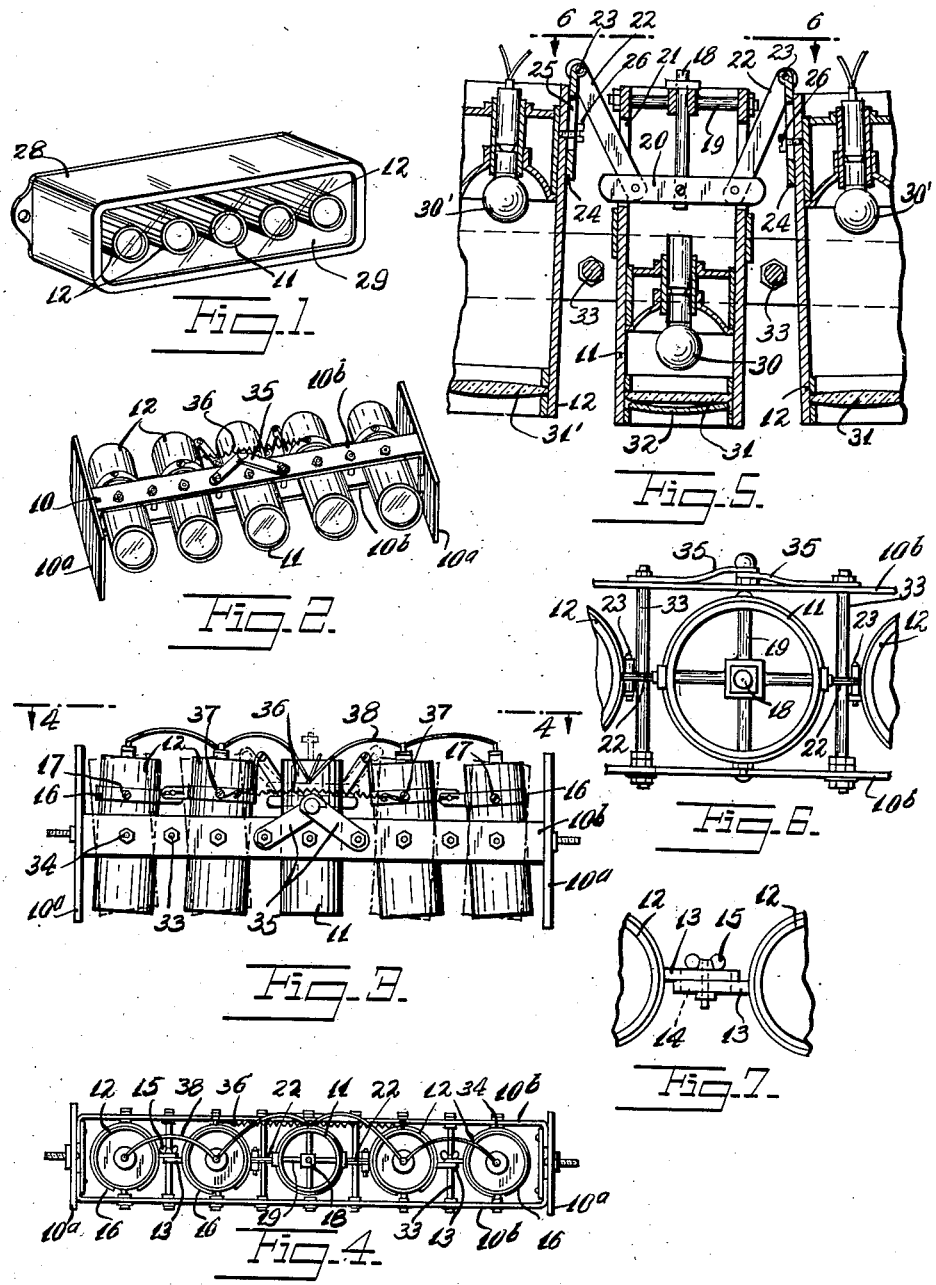
INVENTOR
Willoughby Woodward
BY
ATTORNEY Patented Mar. 2, 1937

2,072,697

UNITED STATES PATENT OFFICE 2,072,697

MULTIPLE HEADLIGHT FOR VEHICLES

Willoughby Woodward, New York, N. Y.

Application July 21, 1936, Serial No. 91,647

2 Claims. (Cl. 240—7.1)

This invention relates to new and useful improvements in a multiple headlight for vehicles.

The invention has for an object the construction of a headlight as mentioned which is characterized by a body, a central lamp element fixed thereon, and a plurality of auxiliary lamp elements on each side of said central lamp element and pivotally mounted on the body and associated with mechanism by which they may be directed in various directions.

Still further the invention contemplates the provision of a novel means for pivotally connecting at various angular positions the auxiliary lamp elements with each other.

Another object of the invention resides in the provision of an operator stem and links associated with the stem and the auxiliary lamp elements for simultaneously pivoting them together or apart.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a multiple headlight for vehicles constructed according to this invention.

Fig. 2 is a perspective view of the multiple headlight with the outer casing removed.

Fig. 3 is an enlarged plan view of Fig. 2.

Fig. 4 is an elevational view looking in the direction of the line 4—4 of Fig. 3.

Fig. 5 is a fragmentary enlarged horizontal sectional view of the central portion of Fig. 4.

Fig. 6 is an elevational view looking in the direction of the line 6—6 of Fig. 5.

Fig. 7 is a fragmentary enlarged detailed view of a portion of Fig. 4.

The multiple headlight for vehicles comprises a body 10 consisting of end plates 10<sup>a</sup> fixedly held in a spaced position by a pair of parallel superimposed strips of metal material 10<sup>b</sup>. A central lamp element 11 is fixedly mounted on the body 10, and more particularly, between the strips 10<sup>b</sup>. A plurality of auxiliary lamp elements 12 are arranged on each side of the central lamp element and are pivotally mounted on the body 10, more particularly by reason of being pivotally mounted between the strips 10<sup>b</sup>.

A means is provided for pivotally connecting at various angular positions the auxiliary lamp elements 12, and includes lugs 13 projecting from adjacent sides of the lamp elements and formed with elongated slots 14 through which clamp screws 15 engage. When these clamp screws are loosened the auxiliary elements may be shifted relative to each other and frictionally, pivotally fixed at various angular relations. The lug elements 13 project from annular members 16 slidably engaged upon the auxiliary elements and which are held in fixed positions by set screws 17 engaging through the annular members and abutting the auxiliary elements. These annular members 16 are spaced rearwards of the pivots of the auxiliary elements.

An operator stem 18 is associated with the central lamp element 11. This operator stem is slidably mounted in a spider structure 19 fixedly mounted on the rear end of the lamp element 11. The inner end of the operator stem 18 connects with a transverse bar 20 which has its ends slidably engaging through slots 21 formed in the walls of the central lamp element 11.

Links 22 connect upon one end portions of the bar 20 and extend outwards at an angle to the longitudinal of the lamp element. At the outer ends these links are pivotally connected by pintle elements 23 with members 24 adjustably mounted upon the sides of the auxiliary lamp elements 12 which are adjacent the central lamp element 11. These members 24 are formed with slots 25 through which holding screws 26 engage. When these holding screws are loosened it is possible to adjust the members 24 which will cause a change of the angular relation between the central lamp element and the auxiliary lamp elements.

A casing 28 normally engages over the body 10 for completely housing the operative parts of the multiple headlight. This casing is provided with a front window 39 through which the lamp elements are viewable. The central lamp element 11 is of substantially cylindrical form and provided with an internal lamp 30 which may be viewed through lens 31 and a color screen 32 mounted over the lens. The lens and color screen are arranged upon the front end of the lamp element. The auxiliary lamp elements 12 are also provided with lamps 30'. These lamps are viewable through lenses 31' set in the front portions of cylindrical bodies of the auxiliary lamp elements.

The strip 10<sup>b</sup> are held in fixed positions by bolts 33 which are engaged through the strips 10<sup>b</sup> at positions between the lamp elements. Each of the lamp elements are pivotally supported by a vertical trunnion 34, the elements of which pivotally engage the strips 10ᵇ. The central lamp element 11 is fixedly held by reason of several links 35 which are mounted between one of the strip elements 10ᵇ and the body of the lamp element and so fixedly hold this lamp element in position. A spring 36 is connected between screws 37 mounted upon the auxiliary elements 12 which are adjacent the central element 11. This spring 36 acts to normally force the auxiliary elements to the sides of the central element into diverging positions. Reference numeral 38 indicates electric wires for supplying current to the lamps 30 and 30'.

The operation of the device is as follows:—

The operator stem 18 is adapted to be drawn rearwards either manually or by a linkage system not shown on the drawing. When the operator stem 18 is so drawn the links 22 will pivot the auxiliary elements from the diverging positions shown in full lines in Fig. 3 to converging positions shown in dotted lines in this figure. Thus the headlight may normally embrace a large compass of a country road, and when it is desired to concentrate upon the center of the road, it is merely necessary to move the operator 18 as mentioned.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a multiple headlight for vehicles, a body, a central lamp element fixed on said body, auxiliary lamp elements on each side of said central lamp element and pivotally mounted on said body, a transverse bar having its ends slidably engaged through slots in the sides of said central lamp, an operating stem mounted on said transverse bar and slidably mounted through one end of said central lamp to control the movement of said transverse bar, links having one of their ends pivotally connected on the extended ends of said transverse bar, and members adjustably mounted on the sides of said auxiliary lamp elements to be capable of assuming various positions and pivotally connected with the other ends of said links, whereby said members may be adjusted to different positions on said auxiliary lamp elements to change the relative angular position of said lamp elements in relation to said central lamp element permitting said stem to be used to move said transverse bar and pivot said auxiliary lamp elements in all the adjusted positions thereof.

2. In a multiple headlight for vehicles, a body, a central lamp element fixed on said body, auxiliary lamp elements on each side of said central lamp element and pivotally mounted on said body, a transverse bar having its ends slidably engaged through slots in the sides of said central lamp, an operating stem mounted on said transverse bar and slidably mounted through one end of said central lamp to control the movement of said transverse bar, links having one of their ends pivotally connected on the extended ends of said transverse bar, and members adjustably mounted on the sides of said auxiliary lamp elements to be capable of assuming various positions and pivotally connected with the other ends of said links, whereby said members may be adjusted to different positions on said auxiliary lamp elements to change the relative angular position of said lamp elements in relation to said central lamp element permitting said stem to be used to move said transverse bar and pivot said auxiliary lamp elements in all the adjusted positions thereof, said adjustable mounting comprising, bolts passing through slots in said members and threadedly engaging apertures in the sides of said auxiliary lamp elements.

WILLOUGHBY WOODWARD.